Patented Jan. 10, 1950

2,493,930

UNITED STATES PATENT OFFICE 2,493,930

CEMENTITIOUS COMPOSITION

Joseph P. Ryan, Chicago, Ill.

No Drawing. Application August 22, 1946,
Serial No. 692,374

3 Claims. (Cl. 106—89)

This invention relates in general to a new composition of matter which is particularly adapted for use as a patching material for concrete, plaster and the like.

The embodiment of the invention as specifically disclosed herein is primarily described as relating to the patching of concrete, where an aggregate may be added to the mix if desired. However, it is to be understood that the invention is equally applicable to the patching of other surfaces such as ordinary plaster.

The principal advantage present in the composition of matter of my invention is the greatly increased bonding characteristics between the old and the new surfaces. Heretofore, when ordinary concrete has been used for patching purposes, the bond between the two has been unsatisfactory, and cracking, sloughing off and the like usually occur.

The new composition of this invention has extremely strong bonding characteristics, so strong, in fact, as to be generally unsatisfactory for use in an original concrete mix because of difficulties encountered in removing the forms. In actual tests carried out, I have found it necessary to use steel and brass forms in order that such forms can be more easily removed.

These strong bonding characteristics are obtained by the addition of cryolite ($Na_3AlF_6$) to cement, particularly Portland cement, in suitable proportions, after which the usual aggregate such as limestone, and sand may be added if desired when large areas of deteriorated concrete are to be patched.

Cements in general contain a certain amount of dicalcium mono-silicate which liberates lime when hydrated. The basis of the present invention is the reaction of this liberated lime with the added cryolite to produce sodium aluminate ($Na_3AlO_3$). Theoretically, it is the excellent wetting properties of the sodium aluminate which increases the adhesion and imparts the strong bonding characteristics of the material. Satisfactory results may be obtained by the use of any cementitious material which liberates lime upon hydration and which has intimately associated therewith suitable amounts of cryolite.

The principal object of the invention is to provide a new composition of matter which comprises the reaction product of lime produced by hydration of a cementitious material, and cryolite which has been added thereto.

Another object is to provide a composition of matter which includes cryolite intimately associated with a cementitious material which will liberate lime for reaction with the cryolite when hydrated.

A further object is to provide a composition of matter which consists in the addition of cryolite in suitable proportions to Portland cement, whereby lime will be liberated when the cement is hydrated which will react with the cryolite to produce a material having increased bonding characteristics.

Still another object is to provide a patching composition for deteriorated or broken concrete, plaster and the like which includes a suitable quantity of cryolite added to Portland cement, whereby to produce a reaction product between lime liberated by the cement upon hydration and the cryolite, which has increased bonding characteristics.

A still further object is to provide a method of patching areas of concrete, plaster and the like which includes adding cryolite to Portland cement in intimate association therewith, hydrating the mixture to produce a reaction between the cryolite and the lime liberated from the cement, then applying the resultant compound to the area to be patched.

Other objects and advantages of the invention will appear more fully hereinafter upon a reading of the following description:

A great deal of effort has been made in the past to devise both mechanical and chemical methods of correcting the difficulties of patching concrete and plaster surfaces due to the unsatisfactory adhesion between the old and the new materials. The addition of cryolite to cement reacts with the lime liberated when the cement is hydrated to produce sodium aluminate which has increased wetting properties and makes the resultant compound advantageous for use in patching old and deteriorated concrete structures such as roads, dams, spillways, floors, tanks, buildings and practically any monolithic concrete structures showing structural failure.

Numerous experiments have been carried out to determine what proportion, by weight, of cryolite is best suited for the purposes outlined above. One of the early experiments conducted involved the patching of approximately 621 square feet of a deteriorated walkway. Two separate mixes were made up and applied to the walkway after thorough cleaning and wetting thereof. The first mix was substantially as follows:

| | Pounds |
|---|---|
| Cement (Universal-Atlas modified) | 1350 |
| Cryolite ($Na_3AlF_6$) | 39 |
| Sand (lake shoal sand) | 3767 |
| Stone (crushed limestone) | 2340 |
| Water | 603 |

The sand was laid down first followed by the stone, cement and cryolite and thoroughly mixed by hand. The water was then added and the mixing repeated, and it was found that the mix was good but slightly stiff and stiffened progressively, being appreciable in about 30 minutes. It is to be noted that the ratio of cryolite to cement was approximately 2.9%. The mix was then set in place after the patching area was thoroughly wet and was allowed to take a preliminary set and then covered with wet blankets and allowed to cure for a week before being put into service.

The mix for the second area was substantially as follows:

|  | Pounds |
|---|---|
| Cement (Universal-Atlas modified) | 331.1 |
| Cryolite | 9.5 |
| Sand (lake shoal sand) | 920.7 |
| Stone (crushed limestone) | 512.7 |
| Water | 97.0 |

It will be noted that the percentage of cryolite with respect to cement is substantially the same as in the first mix, being about 2.87%. The main difference in the two mixes is the increase in the cement-water ratio, there being a greater amount of water added in the first mix. This second mix was considered very good although slightly stiff, but due to the rapidity of placing on the patch it was satisfactory for working. This mix was cured in a similar manner to the first mix.

After about one year neither patch showed any evidence of shrinkage, cracking or pulling away at the junctions between the old and new concrete.

Further tests were conducted in the use of adding cryolite to cement and forming a mortar rather than a concrete mix. In conducting these latter experiments, a great number of prismatic bars of a standard cement and a fine aggregate of a specified grading in size with a proper cement-water ratio were cast and cured in the usual specified way. After 28 days of cure, the bars were broken, the stress recorded and were then patched with about ¼ inch thick patch of 1–3 standard mortar with various treatments of surface, and to some of which cryolite had been added. The results of these experiments indicated that the cryolite treated mortar patches gave the highest break, the highest efficiency and the lowest standard deviation of all the useful material. Here again percentage of cryolite with respect to the cement was approximately 3% or perhaps a little less.

All of the foregoing tests indicate that the addition of cryolite to cement increases tremendously the bonding characteristics thereof, thus making such a composition highly satisfactory for use in patching areas such as concrete or plaster. The most desirable percentage of cryolite for best results was determined by averaging the dicalcium mono-silicate content of a great number of shipments of cement from different mills over a period of time. From this was calculated the amount of lime that would be released by hydration of the cement. It was then calculated that the amount of cryolite necessary to combine with the average of the liberated lime was found to be approximately 3% of the cement used in a mix.

Since these figures constitute an average, it will be evident that in some particular instances, there might be insufficient cryolite and in others there might be an excess thereof. If a deficiency results, no problem is created because the approximate 3% addition seems sufficient to produce the required wettability. If an excess occurs, the unreacted cryolite will merely act as a diluent of the mix, but if the excess is too great, there is a possibility of weakening the concrete. In all of the numerous experiments, however, there was not found to be a sufficient excess to cause a weakening of the mix.

Another important discovery which was brought out more forceably by the conducted tests is the fact that the addition of cryolite increases markedly the acceleration of the set. This is especially true as the percentage of cryolite added is increased and it becomes so evident at 4% cryolite addition that the A. S. T. M. Normal Consistency test, which requires that only 4 minutes pass between the time of water addition, the incorporation of water, kneading of the cement and fine aggregate, placing in the mold and beginning reading, can not be carried through due to the beginning of the set. This would, therefore, indicate that probably not more than 4% cryolite addition should be made, although about 3% has been proven to be more satisfactory.

In any mix, however, where it is highly desirable that the time of set be accelerated, the addition of cryolite in percentages above 3 might be desirable.

In furtherance of the various objects of the invention, other experiments were carried out to determine the desirable percentages of water. In a series of experiments carrying out the A. S. T. M. Normal Consistency test using neat cement, it was found that when .5% cryolite is added, 25.5% water is necessary. During the experiments the cryolite ratio was increased up to 3% and it was discovered that water had to be added up to about 29.6%. The resulting curve as between cryolite and the amount of water necessary in neat cement to maintain normal consistency is practically a straight line, that is, the addition of water is substantially proportional to the increase of cryolite up to about 3%. Beyond this point the hydration reaction becomes very rapid and finally can not be controlled to give a normal consistency reading as the percentage of cryolite approaches 4%.

A still further consideration is the fact that the mix containing cryolite is especially useful where the aging concrete is in contact with the corrosive carbon dioxide tending normally to attack the hydrated cement minerals and weaken the structure. Experiments were carried out wherein water suspensions of cryolite and lime were stirred together for 20 minutes, the suspension filtered and the clear liquor made acid by bubbling carbon dioxide through the solution. It was noted that as the pH moved toward 6.7, abundant $Al_2O_3$ precipitated.

This would indicate that when the mix is in contact with corrosive carbon dioxide, the soluble aluminate compound resulting from the action of the cryolite on the lime produces insoluble $Al_2O_3$ as the penetrating waters lower the pH toward 6.7. This would tend to produce an impermeable front to further invasion of the corrosive water and would also furnish protection against the low activity organic acids that are often found in practice to be highly destructive to concrete.

An important detail which must not be overlooked is the fact that the same results are not obtained if the sodium aluminate is added as such. That is to say, this compound must be produced in situ in order for the invention to be effectively carried out.

From the foregoing description it will be evident that I have produced a new composition of matter in the addition of cryolite to cement in proper proportions, which substance upon being hydrated will result in a compound excellently suited for use as a patching material having the characteristics of unusually great bonding strength. Further, the invention is applicable to any mix where it is desired to greatly accelerate the set thereof, and the production of insoluble $Al_2O_3$ in the presence of carbon dioxide makes the compound useful as a protection against the corrosive action of the carbon dioxide and low activity organic acids. It will be clear that certain changes can be made in the materials used and the proportions of the additive without in any way departing from the spirit of the invention, provided, however, that such changes fairly fall within the scope of the claims appended hereto.

Having thus described my invention what I claim as new and desire to secure by Letters Patent of the United States is:

1. A composition of matter comprising a dicalcium mono-silicate cementitious material adapted to liberate calcium hydroxide when hydrated, and from about 0.5% to about 4.0% by weight of cryolite intimately associated therewith.

2. A composition of matter comprising a dicalcium mono-silicate cementitious material adapted to liberate calcium hydroxide when hydrated, and approximately 3% by weight of cryolite intimately associated therewith.

3. A composition of matter comprising Portland cement and from about 0.5% to about 4% by weight of cryolite intimately associated therewith.

JOSEPH P. RYAN.

REFERENCES CITED

The following references are of record in the file of this patent:

UNITED STATES PATENTS

| Number | Name | Date |
|---|---|---|
| 897,160 | Schoenbeck | Aug. 25, 1908 |
| 1,363,045 | Kramer | Dec. 21, 1920 |
| 1,716,527 | Martin | June 11, 1929 |
| 1,904,640 | Windecker | Apr. 18, 1933 |
| 2,071,681 | Brownmiller | Feb. 23, 1937 |
| 2,174,051 | Winkler | Sept. 26, 1939 |